US012695643B2

(12) United States Patent
Krivenok et al.

(10) Patent No.: US 12,695,643 B2
(45) Date of Patent: Jul. 28, 2026

(54) CLOUD-BASED VIRTUALIZED DATA STORAGE SYSTEM WITH TUNNEL-BASED INTER-NODE COMMUNICATIONS

(71) Applicant: Dell Products L.P., Round Rock, TX (US)

(72) Inventors: Dmitry Vladimirovich Krivenok, Dublin (IE); Roman Oderov, St. Petersburg (RU)

(73) Assignee: Dell Products L.P., Round Rock, TX (US)

( * ) Notice: Subject to any disclaimer, the term of this patent is extended or adjusted under 35 U.S.C. 154(b) by 545 days.

(21) Appl. No.: 18/207,792

(22) Filed: Jun. 9, 2023

(65) Prior Publication Data

US 2024/0411575 A1 Dec. 12, 2024

(51) Int. Cl.
| | |
|---|---|
| *H04L 12/46* | (2006.01) |
| *G06F 9/455* | (2018.01) |
| *H04L 67/1097* | (2022.01) |

(52) U.S. Cl.
CPC ...... *H04L 12/4633* (2013.01); *G06F 9/45558* (2013.01); *H04L 67/1097* (2013.01); *G06F 2009/45583* (2013.01); *G06F 2009/45595* (2013.01)

(58) Field of Classification Search
CPC ................. G06F 9/45558; G06F 9/455; G06F 2009/45583; G06F 2009/45595; G06F 3/0631; H04L 67/1097; H04L 12/4633; H05L 45/74
USPC .......................................................... 718/1
See application file for complete search history.

(56) References Cited

U.S. PATENT DOCUMENTS

| | | | | |
|---|---|---|---|---|
| 7,995,571 | B2 | 8/2011 | Park | |
| 8,688,807 | B2 * | 4/2014 | Behringer | ............... H04L 61/30 |
| | | | | 709/200 |
| 10,069,646 | B2 * | 9/2018 | Shen | .................... H04L 12/4633 |
| 10,291,708 | B1 * | 5/2019 | Lyon | ..................... H04L 67/568 |
| 10,547,509 | B2 * | 1/2020 | Pani | ..................... H04L 41/0873 |
| 11,025,483 | B1 * | 6/2021 | Hashmi | ................. H04L 63/164 |
| 2015/0052525 | A1 * | 2/2015 | Raghu | ..................... H04L 67/10 |
| | | | | 718/1 |
| 2015/0254088 | A1 | 9/2015 | Chou et al. | |
| 2021/0026670 | A1 * | 1/2021 | Krivenok | ............ G06F 9/45558 |

* cited by examiner

*Primary Examiner* — Jacob D Dascomb
(74) *Attorney, Agent, or Firm* — BainwoodHuang

(57) ABSTRACT

A cloud-based virtualized data storage system includes cloud computing infrastructure executing instances of virtual storage appliance (VSA) software to realize respective VSAs which have virtualized network interfaces to a cloud network and to cloud storage. Each VSA has storage processor (SP) nodes each having (1) an inter-node (IN) network interface for communicating with the other SP node of the VSA and an intra-cluster (IC) network interface for communicating with other VSAs of a cluster, the IN and IC network interfaces using private network addresses not routable in the cloud network, and (2) a network virtualization layer connecting the IN and IC network interfaces to an IN tunnel and an IC tunnel, respectively, carried in the cloud network using cloud network addresses routable in the cloud network, with the IN tunnel providing communications between the SP nodes of a VSA, and the IC tunnel providing communications among VSAs of a cluster.

19 Claims, 3 Drawing Sheets

CLOUD-BASED VIRTUALIZED DATA STORAGE SYSTEM WITH TUNNEL-BASED INTER-NODE COMMUNICATIONS

BACKGROUND

The invention is related to the field of data storage.

SUMMARY

A cloud-based virtualized data storage system is disclosed that includes cloud computing infrastructure having compute nodes interconnected by a cloud network and executing co-operating instances of virtual storage appliance software to realize respective virtual storage appliances (VSAs). The VSAs have respective virtualized network interfaces to the cloud network and to cloud storage providing underlying storage for logical storage provided to data storage clients by the VSAs. Each VSA has a respective pair of storage processor (SP) nodes each having (1) an inter-node (IN) network interface for communicating with the other SP node of the same VSA and an intra-cluster (IC) network interface for communicating with other VSAs of a respective cluster, the IN and IC network interfaces using private network addresses not routable in the cloud network, and (2) a network virtualization layer connecting the IN and IC network interfaces to an IN tunnel and an IC tunnel, respectively, The tunnels are carried in the cloud network using corresponding cloud network addresses routable in the cloud network, with the IN tunnel providing inter-node communications between the SP nodes of a VSA, and the IC tunnel providing inter-VSA communications among VSAs of a cluster.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
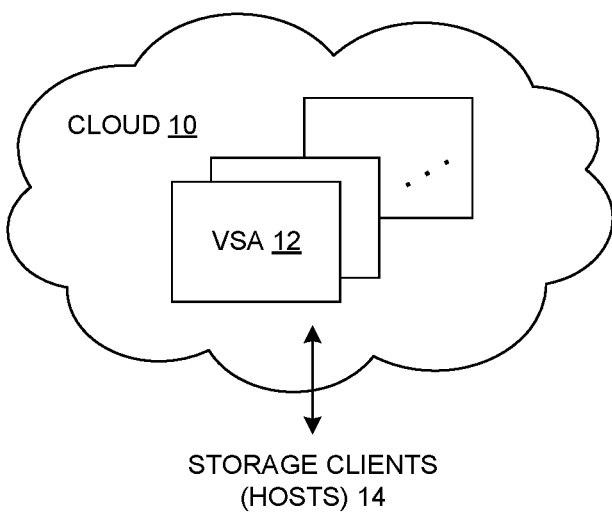
FIG. 1 is a simplified block diagram of a cloud-based data storage system.

An approach to providing cloud-based data storage services is disclosed that is based on adapting a (physical) storage appliance's internal networking to a cloud deployment (termed virtual storage appliance (VSA) in the cloud), while keeping this change transparent to any appliance-hosted applications and services. VSA in the cloud may provide enterprise-grade advanced data services to customers similarly to conventional on-premises alternatives, such as highly available and efficient data store, block and file replication capabilities, block and file frontend I/O and corresponding frontend/backend networking. A solution is based on carrying internal networking as an overlay on top of a tunnel mechanism that uses cloud native underlay networking to interconnect VSA nodes and appliances in the cloud.

In the enterprise storage world, there is a need to organize inter-node communication between internal storage processing nodes of a single storage appliance, as well as interconnect all nodes of all appliances in a storage cluster. These internal networks are used for internal metadata exchange between control plane components of nodes in the cluster, cache synchronization, communication between other internal components, etc. In practical use, such internal networks are managed internally and are not visible to external customers, for example. There should be no need for a customer to configure the internal networks manually, thus the networking characteristics and settings usually may be auto generated or even hardcoded. For example, inter-node communication between two nodes is appliance-local and each node may use a predefined network address (e.g., internet protocol (IP) address), which is used by internal components and services. For intra-cluster communication, even though new appliances may be added to the cluster over time, the IP addresses can be auto generated, for example from IPv6 unique local address (ULA) range, and used accordingly by the internal applications and services.

When moving to a cloud deployment, the goal is to adjust common on-premises storage system internal networking to the cloud world but minimize the corresponding changes and keep the internal networking mechanisms as they are (e.g., continue using predefined or auto-generated addresses etc.), to avoid the need to redesign or re-code internal components and applications.

However, in the cloud the particular IPs used in the internal networking may not be allowed. For example, Amazon Web Services (AWS) cloud natively supports only private IP ranges and doesn't support any IPv4 Link-local or IPv6 ULA addresses. Known approaches for addressing this issue include the use of per-interface manual network configuration steps. Known storage systems lack an internal (intra-cluster and/or inter-node) network model that works consistently in both physical appliances and in a public cloud deployment.

Assuming that a cloud environment may not support network addresses used by an appliance in typical on-premises deployments (for example, predefined IPv4 addresses for inter-node communication, and IPv6 ULA auto-generated addresses for intra-cluster communication), a disclosed approach employs an overlay/underlay networking concept for the cloud-deployed virtual storage appliance (VSA). Internal VSA networks become overlay networks, and traffic is carried by underlay cloud-native networking. Overlay networking may be organized using a tunneling solution (e.g., VxLAN), with the tunnels using allocated (routable) IP addresses from the cloud subnet and bound to a particular network interface. This tunneling approach provides, in an application-transparent manner, the flexibility needed to support existing internal networking organization of a storage appliance.

EMBODIMENTS

FIG. 1 depicts a cloud-based data storage system at a high level. A cloud infrastructure (cloud) 10 hosts a plurality of virtual storage appliances (VSAs) 12 that provide data storage services to separate clients, typically referred to as "hosts" 14. As described more below, the cloud 10 is a collection of physical computing resources executing various software to provide storage services in a generally abstracted and typically remoted fashion, such as making the services available over a wide-area network (e.g., public internet) and freeing service consumers from knowledge and responsibility for underlying service infrastructure. Additional details are provided below.

Figure 2:
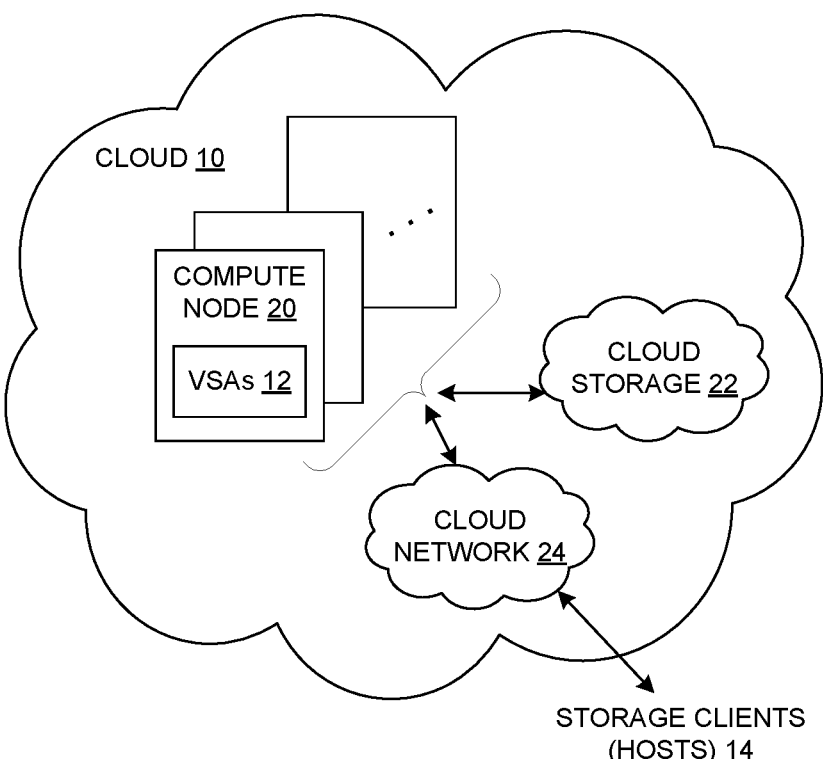
FIG. 2 is a more detailed block diagram of a cloud-based data storage system.

FIG. 2 depicts additional details relevant to the present disclosure. The cloud 10 is shown as including a plurality of compute nodes 20, cloud storage 22, and a cloud network 24. Each compute node 20 is a computerized device having one or more processors, memory, local data interconnect (e.g., high speed busses), and I/O interface circuitry, as generally known. In one embodiment, the compute nodes 20 are virtual-computing hosts that host applications using the paradigm of virtual computing, i.e., using virtual machines and a supervisory mechanism such as a hypervisor. As described more below, each VSA 12 may be realized as a collection of virtual machines each executing an image of a data storage processing node. The VSAs 12 interface to the hosts 14 and among themselves via the cloud network 24, providing a variety of data storage services generally including block and/or file storage along with related functionality, such as replication, snapshots, de-duplication, and a variety of other data storage services. The VSAs 12 generally present a host view of storage based on logical or virtual storage devices and use the cloud storage 22 for underlying physical storage.

Figure 3:
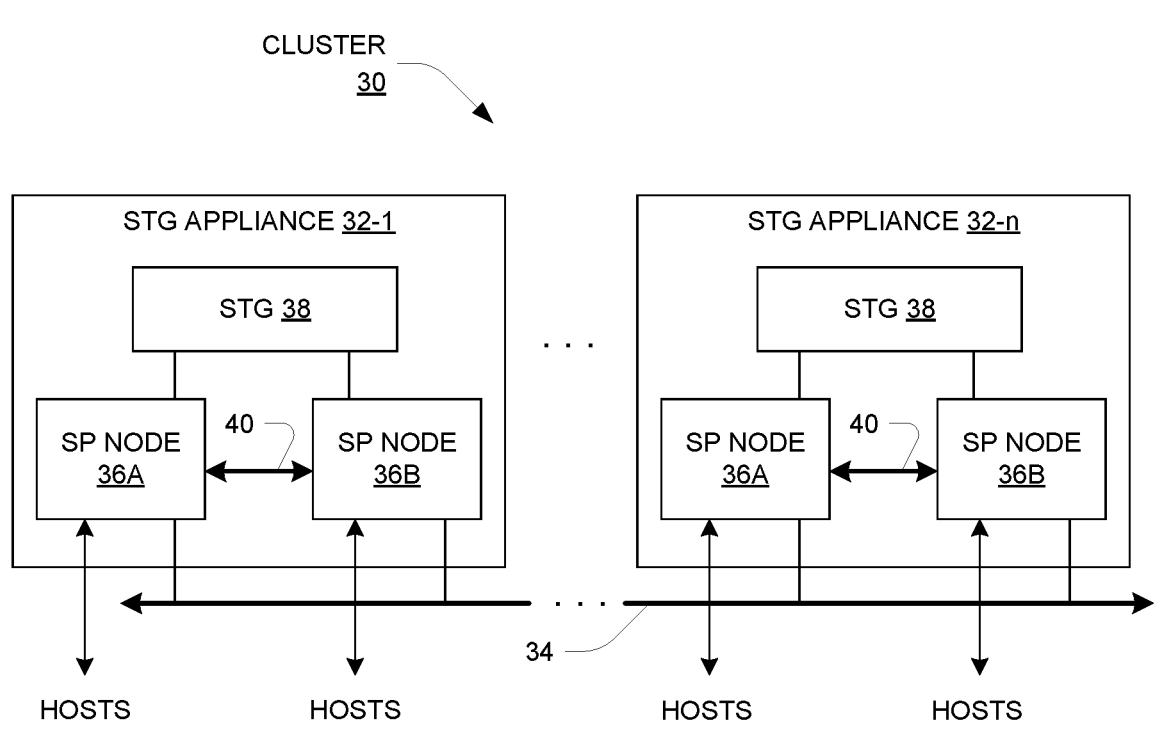
FIG. 3 is a block diagram of a purpose-built data storage system as known in the art.

FIG. 3 is a depiction of a data storage cluster 30 as known in the prior art. It includes two or more physical (purpose-built) data storage appliances 32-1, . . . , 32-n (generally 32) each connected to a cluster network 34. Each appliance 32 includes a pair of storage processor (SP) nodes 36A, 36B (generally 36) and local physical data storage resources (STG) 38, such as an array of magnetic disks and/or Flash memory devices. Each SP node 36 interfaces to the cluster network 34 for cluster-wide communication among the appliances 32, and it also interfaces to a local inter-SP network 40 for communicating with the other SP 36 of the same appliance 32. The networks 34, 40 provide for the above-mentioned internal data exchange among control plane components of nodes 36 in the cluster 30, e.g., cache synchronization, communication between other internal components, etc.

It is emphasized that in the purpose-built environment of FIG. 3, the storage appliances 32 are specialized hardware systems and the SP nodes 36 are specialized computerized devices that execute highly complex storage-processing software to provide data storage functionality. The collection of storage-processing software that is executed is referred to herein as an "image", which reflects potential portability and the possibility of using the software in other environments. An example of such a use is described below.

Also, of particular interest in the present context is the use by the nodes 36 of certain network addresses for communicating on the networks 40, 34. In the purpose-built environment of FIG. 3, the networking characteristics and settings may be auto generated or even hardcoded. For example, inter-node communication between two nodes 36A, 36B over network 40 is appliance-local and each node 36 may use a predefined network address (e.g., internet protocol (IP) address) that is known by internal components and services. For intra-cluster communication on network 34, even though new appliances 36 may be added to the cluster 30 over time, the IP addresses can be auto generated, for example from IPv6 unique local address (ULA) range, and used accordingly by the internal applications and services.

For purposes of description, these network addresses used by nodes 36 are identified as follows:

1. IP_IN_1A and IP_IN_1B are predefined IP addresses of nodes 36A and 36B respectively on the inter-node (IN) network 40 within each appliance 32.

2. IP_IC_1A, IP_IC_1B, . . . , IP_IC_nA, IP_IC_nB are the predefined IP addresses of respective nodes 36 on the intra-cluster (IC) network 34 across all appliances 32-1, . . . 32-n of the cluster 30.

As described below, in one embodiment the VSAs 12 (FIG. 1) contain instances of storage processing nodes that may include substantially the same software image used to realize an SP node 36 in the purpose-built environment. It will be appreciated that this feature can provide a way for a provider to readily deploy a cloud-based data storage product by leveraging existing software of a purpose-built product. In particular, in such an embodiment it may be that the software-realized nodes continue to utilize the same network addresses. While this feature contributes to such a ready deployment of existing software, it creates a problem in that the network addresses and configuration are generally not compatible with the networking structure (e.g., cloud network 24) of the cloud environment 10. As an example, these addresses are likely not directly "routable" in the cloud network 24, i.e., they are not contained within the actual network address space utilized by the cloud network components (routers etc.) of the cloud network 24.

Figure 4:
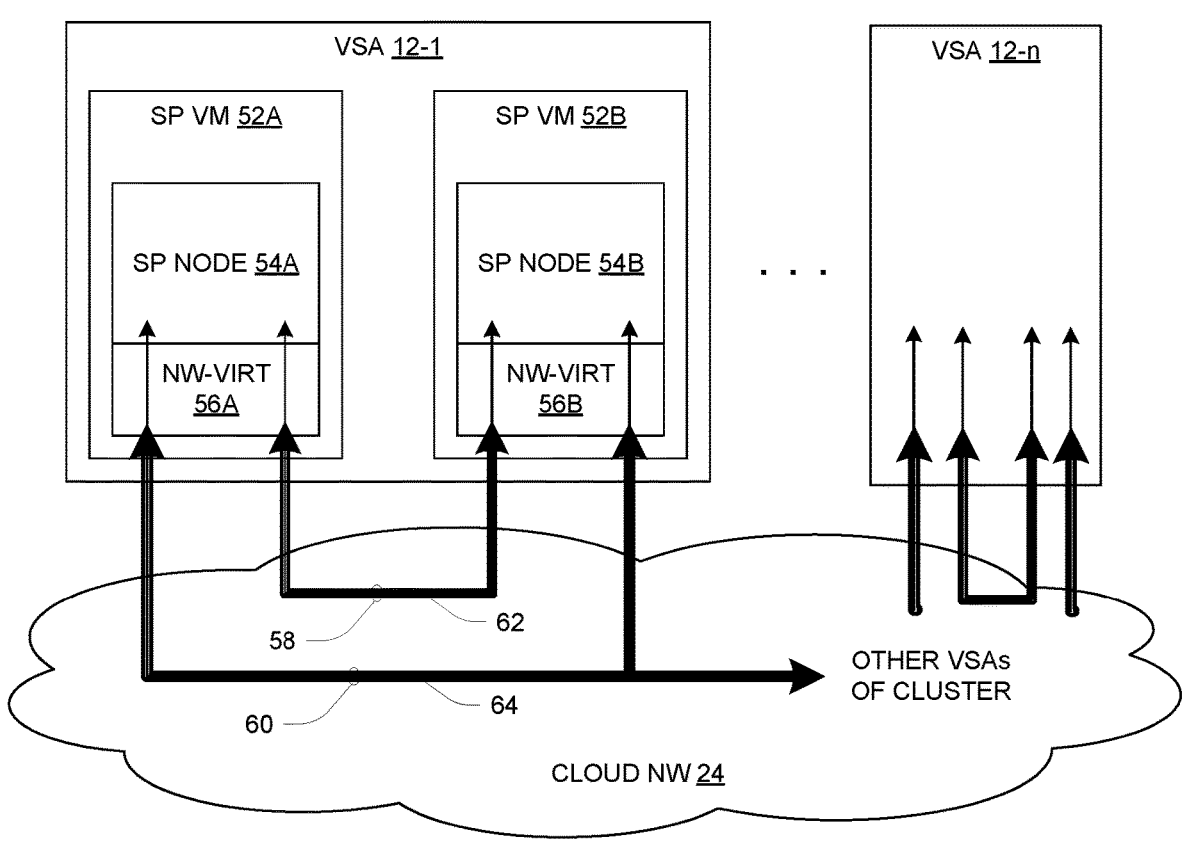
FIG. 4 is a block diagram of a cluster of virtual storage appliances (VSAs) and associated networking details in the cloud-based data storage system.

FIG. 4 shows a cloud-based cluster 50 realized in the cloud 10 of FIGS. 1 and 2. It includes a set of VSAs 12-1, . . . , 12-n (generally 12) each having a pair of storage processor virtual machines (SP VMs) 52A, 52B. Each VM 52 executes a collection of software to realize a corresponding SP node 54 (54A, 54B), along with a respective network-virtualization component (NW-VERT) 56 (56A, 56B). It is emphasized that the SP nodes 54 are functional blocks realized by execution of storage-processing software on generic computing hardware (i.e., compute nodes 20) of the cloud infrastructure 10. As indicated above, in one embodiment the SP nodes 54 may be realized by execution of the same software image used by the SP nodes 36 of the purpose-built environment (FIG. 3). More generally, it is assumed that the SP nodes 54 have specialized network configuration that is incompatible with the cloud network 24, e.g., using non-routable network addresses as explained above. In the following description this incompatible network aspect is referred to as "private". The network virtualization components 56 are used to handle this incompatibility, as explained below.

As shown in FIG. 4, each SP VM 52 has connections to a pair of network tunnels 58 and 60, with tunnel 58 being an inter-node (IN) tunnel used within a VSA 12 and the tunnel 60 being an intra-cluster (IC) tunnel used across all VSAs 12 of the cluster 40. In particular, the IN tunnel 58 carries a private IN network 62 used by the SP nodes 54 of a VSA 12, and the IC tunnel 60 carries a private IC network 64 used by the SP nodes 44 54 all VSAs 12 of the cluster 50. In one embodiment, the private networks 62, 64 may be the IN and IC networks 40, 34 respectively of the purpose-build environment of FIG. 3.

Within each SP VM 52, the tunnels 58, 60 are terminated at the network virtualization component 56, while their respective carried networks 62, 64 extend into the SP nodes 44 as shown. The tunnels 58, 60 are set up and maintained by the network virtualization components 56, which also provide the required mapping and other functions to carry the networks 62, 64 for the SP nodes 54 using the tunnels 58, 60. In one embodiment, each SP VM 52 has a respective virtual port (not shown) for connection to the cloud network 24, configured with a respective cloud-network address (i.e., an address routable in the cloud network 24) for all communications (including tunnels 58, 60) in the cloud network 24. These network addresses (also referred to herein as "cloud underlay" addresses) may be represented as IP_1A, IP_1B for the VMs 52A, 52B of VSA 12-1, and generally as IP_nA, IP_nB for the VMs 52 of VSA 12-*n*. The network virtualization components 56 may utilize any of a variety of generally known tunneling techniques to establish, maintain and utilize the tunnels 58, 60.

Through use of the tunnels 58, 60 the nodes 54 are free to use their respective "private" network addresses (e.g., IP_IN_xx and IP_IC_xx as identified above) for the communications of private networks 62, 64 without having to worry about the incompatibility with the cloud network 24. This flexibility supports the above-described use case of realizing the SP nodes 54 using the software image of the SP nodes 36 of the purpose-built environment.

As already mentioned, the internal networks' IP addresses may be assigned once upon deployment of VSA appliance, and then do not require further change, relieving a customer of any need for explicitly managing the IPs and/or reconfiguring them.

Assuming a tunneling solution as described herein, in operation it is necessary to ensure that the underlay connectivity is properly configured, and all necessary tunnels set up. Control-plane functions of the VSAs 12 should be consistent with the requirements and expectations of the cloud network 24, including:

Upon deployment, auto-allocated cloud native underlay IPs of the ports of the VMs 52 are queried The required tunnels (58 and 60) are set up among the nodes 54 using the underlay IPs The underlay IPs are constantly monitored by VSA control plane If an underlay IP is changed (due to an error, reconfiguration, or a recovery flow for example), VSA control plane re-orchestrates the tunneling on all affected nodes 54 (note that both sides of the tunnel are re-orchestrated), while the higher-level applications and services are unaffected due to their use of the private networks 62, 64 carried by the tunnels.

Additional considerations may be applicable. For example, public clouds may have per-flow (5 tuple) bandwidth limits that can become traffic bottlenecks. To avoid or ameliorate these effects, the solution may be enhanced in some manner such as the following:

1. Select tunneling protocol (and implementation in the OS) with native multi-flow support between any two endpoints.

2. Alternatively, if necessary then a logical bond interface can be introduced on top of two or more tunneling interfaces.

One important feature of the inter-node interconnect in purpose-built storage appliances is that the interconnect is often completely internal and invisible to the end user. This means that traffic flowing via the interconnect does not have to be encrypted or secured in other ways. When the SP node image is instead executed as part of a VSA 12 in a public cloud, such an assumption is no longer true. In this case it may be desired to use transparent encryption of traffic flowing via the tunneling interfaces so that all packets visible outside of the cloud instance are encrypted.

In brief summary, a tunneling approach for internal VSA networking in a cloud as described herein may provide one or more advantages as follows:

1. Simplify multi-node/multi-appliance clustering configurations in the cloud

2. Enable use of existing applications/services with no changes to their network configuration; applications may have an illusion of unchangeable IPs.

3. Provide potentially infinite IP address space for internal storage system consumers due to the possibility of auto-generating any IPs (e.g., IPv6 ULAs), which can beneficial for container-based storage system design by simplifying the on-boarding of new containers 4. Bypass possible cloud infrastructure limits or quotas, such as limits on the number of network interfaces per instance, the number of IPs per network interface, the number of available IPs in a subnet, the number of subnets themselves, etc.

5. Free customers from any need to manually manage cloud networking limitations/ranges/resources even in case of recovery While various embodiments of the invention have been particularly shown and described, it will be understood by those skilled in the art that various changes in form and details may be made therein without departing from the scope of the invention as defined by the appended claims.

What is claimed is:

1. A cloud-based virtualized data storage system comprising:

a cloud computing infrastructure having compute nodes interconnected by a cloud network and executing co-operating instances of virtual storage appliance software to realize respective virtual storage appliances (VSAs), wherein the VSAs have respective virtualized network interfaces to the cloud network and to cloud storage providing underlying storage for logical storage provided to data storage clients by the VSAs, and wherein each VSA has a respective pair of storage processor (SP) nodes each having (1) an inter-node (IN) network interface for communicating with the other SP node of the same VSA and an intra-cluster (IC) network interface for communicating with other VSAs of a respective cluster, the IN and IC network interfaces using private network addresses not routable in the cloud network, and (2) a network virtualization layer connecting the IN and IC network interfaces to an IN tunnel and an IC tunnel, respectively, the tunnels being carried in the cloud network using corresponding cloud network addresses routable in the cloud network, the IN tunnel providing inter-node communications between the SP nodes of a VSA, the IC tunnel providing inter-VSA communications among VSAs of a cluster, wherein each VSA is realized as a collection of virtual machines each executing an image of a data storage processing node, and wherein the cloud network addresses are auto-allocated cloud native underlay Internet Protocol (IP) addresses of respective ports of the virtual machines, and wherein the VSAs perform control-plane functions that include upon deployment, querying the auto-allocated cloud native underlay IP addresses of the ports of the virtual machines and setting up both the IN and IC tunnels using the underlay IP addresses.

2. The cloud-based virtualized data storage system of claim 1, wherein the compute nodes are virtual-computing host computers that execute applications using virtual machines and a supervisory mechanism.

3. The cloud-based virtualized data storage system of claim 2, wherein the control-plane functions performed by the VSAs further include continually monitoring the ongoing use of the underlay IP addresses by the virtual machines, and, in the event that an underlay IP address is changed, re-orchestrating the tunnels on all affected storage processing nodes without affecting operation of higher-level applications and services due to their use of private IN and IC networks carried by the tunnels.

4. The cloud-based virtualized data storage system of claim 3, wherein the underlay IP address is changed due to one or more of an error, a reconfiguration, or a recovery.

5. The cloud-based virtualized data storage system of claim 1, wherein the VSAs collectively provide a variety of data storage services including block and file storage along with related data storage services including one or more of replication, snapshots, and de-duplication.

6. The cloud-based virtualized data storage system of claim 1, wherein each storage processing node executes a software image used to realize a counterpart storage processing node in a separate purpose-built data storage system environment, including a network configuration using the private network addresses which are routable in the purpose-built data storage system environment.

7. The cloud-based virtualized data storage system of claim 1, wherein the network virtualization layers use transparent encryption of traffic flowing via the tunnels so that data packets flowing via the tunnels are encrypted.

8. The cloud-based virtualized data storage system of claim 1, wherein the private network addresses of the IN and IC network interfaces are hardcoded.

9. The cloud-based virtualized data storage system of claim 1, wherein the private network addresses of the IN and IC network interfaces are auto-generated.

10. The cloud-based virtualized data storage system of claim 9, wherein the private network addresses of the IN and IC network interfaces are auto generated from an IPv6 unique local address (ULA) range.

11. A method of providing data storage services using a cloud-based virtualized data storage system, comprising:

instantiating and operating a plurality of instances virtual storage appliance software to realize respective virtual storage appliances (VSAs), wherein the VSAs have respective virtualized network interfaces to a cloud network and to cloud storage providing underlying storage for logical storage provided to data storage clients by the VSAs, and wherein each VSA has a respective pair of storage processor (SP) nodes each having (1) an inter-node (IN) network interface for communicating with the other SP node of the same VSA and an intra-cluster (IC) network interface for communicating with other VSAs of a respective cluster, the IN and IC network interfaces using private network addresses not routable in the cloud network, and (2) a network virtualization layer connecting the IN and IC network interfaces to an IN tunnel and an IC tunnel, respectively;

instantiating and operating the IN and IC tunnels in the cloud network using corresponding cloud network addresses routable in the cloud network, the IN tunnel operated to provide inter-node communications between the SP nodes of a VSA, the IC tunnel operated to provide inter-VSA communications among VSAs of a cluster;

wherein each VSA is realized as a collection of virtual machines each executing an image of a data storage processing node; and wherein the cloud network addresses are auto-allocated cloud native underlay Internet Protocol (IP) addresses of respective ports of the virtual machines, and wherein the VSAs perform control-plane functions that include upon deployment, querying the auto-allocated cloud native underlay IP addresses of the ports of the virtual machines and setting up both the IN and IC tunnels using the underlay IP addresses.

12. The method of claim 11, wherein the control-plane functions performed by the VSAs further include continually monitoring the ongoing use of the underlay IP addresses by the virtual machines, and, in the event that an underlay IP address is changed, re-orchestrating the tunnels on all affected storage processing nodes without affecting operation of higher-level applications and services due to their use of private IN and IC networks carried by the tunnels.

13. The method of claim 12, wherein the underlay IP address is changed due to one or more of an error, a reconfiguration, or a recovery.

14. The method of claim 11, wherein the VSAs collectively provide a variety of data storage services including block and file storage along with related data storage services including one or more of replication, snapshots, and de-duplication.

15. The method of claim 11, wherein each storage processing node executes a software image used to realize a counterpart storage processing node in a separate purpose-built data storage system environment, including a network configuration using the private network addresses which are routable in the purpose-built data storage system environment.

16. The method of claim 11, wherein the network virtualization layers use transparent encryption of traffic flowing via the tunnels so that data packets flowing via the tunnels are encrypted.

17. The method of claim 11, wherein the private network addresses of the IN and IC network interfaces are hardcoded.

18. The method of claim 11, wherein the private network addresses of the IN and IC network interfaces are auto-generated.

19. The method of claim 18, wherein the private network addresses of the IN and IC network interfaces are auto generated from an IPv6 unique local address (ULA) range.

* * * * *